(12) United States Patent
Kidono et al.

(10) Patent No.: US 6,970,193 B1
(45) Date of Patent: Nov. 29, 2005

(54) ELECTRONIC IMAGING APPARATUS OPERABLE IN TWO MODES WITH A DIFFERENT OPTICAL BLACK CORRECTION PROCEDURE BEING EFFECTED IN EACH MODE

(75) Inventors: Masami Kidono, Tachikawa (JP); Hideaki Yoshida, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 791 days.

(21) Appl. No.: 09/614,725

(22) Filed: Jul. 12, 2000

(30) Foreign Application Priority Data

Jul. 14, 1999 (JP) ................................. 11-199750

(51) Int. Cl.⁷ .......................... H04N 5/217; H04N 9/64
(52) U.S. Cl. .................. 348/245; 348/241; 348/243; 348/246; 348/247
(58) Field of Search ................................ 348/241, 243, 348/248, 249, 245

(56) References Cited

U.S. PATENT DOCUMENTS

| | | | | |
|---|---|---|---|---|
| 4,742,394 A | * | 5/1988 | Dielhof | 348/245 |
| 4,760,453 A | * | 7/1988 | Hieda | 348/243 |
| 5,521,639 A | * | 5/1996 | Tomura et al. | 348/243 |
| 5,608,455 A | * | 3/1997 | Oda | 348/295 |
| 6,084,634 A | * | 7/2000 | Inagaki et al. | 348/294 |
| 6,160,578 A | * | 12/2000 | Carroll et al. | 348/222.1 |
| 6,396,539 B1 | * | 5/2002 | Heller et al. | 348/246 |

FOREIGN PATENT DOCUMENTS

| | | | | | |
|---|---|---|---|---|---|
| JP | 05130450 A | * | 5/1993 | | H04N 5/18 |
| JP | 07067038 A | * | 3/1995 | | H04N 5/335 |
| JP | 09135388 A | * | 5/1997 | | H04N 5/335 |

OTHER PUBLICATIONS

Translation of JP 07-067038 to Shimura.*
Translation of JP-05130450 to Oba.*

* cited by examiner

*Primary Examiner*—Tuan Ho
*Assistant Examiner*—Brian Genco
(74) *Attorney, Agent, or Firm*—Westerman, Hattori, Daniels & Adrian, LLP

(57) ABSTRACT

An image pickup apparatus including: CCD image pickup device; a correction reference signal generating section for generating a correction reference signal for correcting effective image signals of the image pickup device from output signals of a vertical optical black pixel portion of the image pickup device; an image signal correcting section for subtracting the correction reference signal from an effective image signal; and CCD driver having a plurality of drive modes for driving the image pickup device to read pixel charges as output signals; wherein, when generating the reference signal, said correction reference signal generating section performs different types of reference signal generation processing corresponding to the plurality of drive modes of the CCD driver.

9 Claims, 6 Drawing Sheets

ELECTRONIC IMAGING APPARATUS OPERABLE IN TWO MODES WITH A DIFFERENT OPTICAL BLACK CORRECTION PROCEDURE BEING EFFECTED IN EACH MODE

This application claims benefit of Japanese Application No. Hei 11-199750 filed in Japan on Jul. 14, 1999, the contents of which are incorporated this reference.

BACKGROUND OF THE INVENTION

The present invention relates to image pickup apparatus, and more particularly relates to an image pickup apparatus having a function for correcting false signals.

In conventional solid-state image pickup apparatus using CCD image pickup device, there is a problem of image quality deterioration due to smears which occur as a phenomenon peculiar to CCD image pickup device when an intense light has been incident thereupon. In particular, such phenomenon occurs as charge not captured at its true charge accumulating region is caused to leak into the vertical transfer line across the potential barrier. If caused by an ordinary and steady light, such phenomenon occurs over a vertical transfer period. In the case of a spot light, it results in a vertical stripe extended up and down therefrom. Also, if the image object includes a horizontally extended bright portion such as a scenic view containing the sky, a flare-like whitish image over the frame as a whole is the outcome.

A method for example as disclosed in Japanese patent application laid open Hei-7-67038 has been known as the method for correcting such phenomenon. Noticing the fact that a smear occurs substantially at the same level along the vertical direction due to the principle of its occurrence, the output level of vertical 0B (optical black) pixels, i.e., an optically concealed accumulating pixel region outside the effective pixel region, is determined as a smear eliminating reference signal which is subtracted from the pixel output signals of an effective frame.

Specifically, the smear eliminating reference signal as disclosed in the same laid-open application is defined as line information (mean value data corresponding to pixels of one line) obtained by means of addition as mean values (the respective mean of every 12 vertical pixels) of signals of vertical 0B pixels consisting of a plurality of lines (12 lines in an embodiment thereof), so as to reduce the effect of randomized noise contained in such reference signal. Hence a consideration is made in order not to cause an additional fixed pattern noise to the contrary due to the smear correction.

Further, special drive methods are sometimes used in image pickup apparatus using CCD image pickup device. As a typical example of special drive, a description is given below with respect to a known "n-multiple rate vertically added drive (n-addition drive)" which is a high-speed, high-sensitivity readout drive. In this drive method, the number of pixels (transfer clock number) to be transferred to H (horizontal) transfer line from V (vertical) transfer line during each one H (horizontal) blanking period is set to a natural number n of two or more instead of the usual "1". The number of vertical lines corresponding to one frame is thereby set to 1/n. As a result, the readout time of one frame becomes 1/n, and the sensitivity is increased to be n times greater by charge addition at the time of transfer.

It should be noted that, as a further developed form of this drive method, "m/n-addition drive" for selectively transferring only specified m ($\leq$n) lines out of n lines to be added at the time of transfer from the vertical transfer line to the horizontal transfer line (including "n-addition drive" as a special case, i.e., "n/n-addition drive" where m=n) is also used in charge transfer to the V transfer line from the signal accumulating region of the pixels before V transfer, for the purpose of considering color coding pattern in a color image pickup device or of suitably adjusting the sensitivity. However, since these are essentially identical as far as the explanation of the present invention is concerned, this specification will explain the case of m=n, i.e., the above described n-addition drive as the representative of these.

Since the smear correction method described above as a prior-art technique premises a normal drive, it cannot be applied to an image pickup apparatus for performing special drive such as the above described n-addition drive. Specifically, suppose that subtraction and correction are made by obtaining a smear eliminating reference signal as "mean value data corresponding to pixels of one line" as disclosed in the above laid-open application. Since the smear component contained in the output signals of n-addition drive corresponds to "n" lines due to addition at the time of transfer, the smear component corresponding to "n-1" lines remains as a result without being eliminated. Further, if pixel defect occurs in the vertical 0B pixels, such information is contained also in the smear eliminating reference signal. Hence there is another problem that additional fixed-pattern noise is newly caused to the contrary due to the correction.

SUMMARY OF THE INVENTION

To solve the above described problems in the image pickup apparatus having the conventional smear correction means, it is an object of the present invention to provide an image pickup apparatus in which, even if a plurality of image pickup device drive modes are provided, a favorable smear correction can be performed in respect of each drive mode with reducing to a minimum such problems as occurrence of newly added noise due to the correction processing.

In accordance with a first aspect of the invention, there is provided an image pickup apparatus, including: an image pickup device; correction reference signal generation means for generating a correction reference signal from output signals of a vertical optical black pixel portion of the image pickup device, for correcting effective image signals outputted as signal of an effective pixel portion of the image pickup device; image signal correction means for subtracting the correction reference signal from the effective image signals; and image pickup device drive means having a plurality of drive modes for driving the image pickup device to read pixel charge as an output signal. The correction reference signal generation means performs different types of correction reference signal generation processing in generating the reference signal, corresponding to the plurality of drive modes of the image pickup device drive means.

By thus performing different types of correction reference signal generation processing corresponding to the plurality of drive modes, the image pickup apparatus can be achieved as capable of favorable smear correction for each drive mode with reducing to a minimum such problems as occurrence of newly added noise due to the correction processing. The above object is thereby accomplished.

It is another object of the invention to provide an image pickup apparatus having as drive modes a normal mode and n-addition mode, capable of favorable smear correction with reducing to a minimum such problems as occurrence of newly added noise due to pixel defect.

In accordance with a second aspect of the invention, one of the plurality of drive modes of the image pickup apparatus according to the first aspect is a normal drive mode for severally reading out each pixel charge of the image pickup device and another is n-addition mode for reading out pixel charges of the image pickup device as vertically added for a predetermined number n (n being a whole number greater than 1).

By using such construction, it becomes possible to perform favorable smear correction for normal mode and for n-addition mode with reducing to a minimum such problems as occurrence of newly added noise due to pixel defect. In other words, a true smear correction can be performed even at the time of an addition mode for example by performing a level processing of correction reference signal corresponding to the added number. The above object is thereby accomplished.

It is a further object of the invention to provide an image pickup apparatus in which a smear correction of high image quality can be performed without causing an occurrence of newly added noise due to pixel defect and at the same time with adequately suppressing the effect of randomized noise.

In accordance with a third aspect of the invention, the image pickup apparatus according to the second aspect, even in n-addition drive mode, exceptionally performs readout by the normal drive mode for severally reading out each pixel charge when reading out the vertical optical black pixel portion.

By using such construction, since, even in n-addition mode, readout by normal drive mode is exceptionally performed when reading out the vertical OB pixel signals, newly added noise due to pixel defect does not occur. Further it becomes possible to perform smear correction of high image quality with adequately suppressing the effect of randomized noise. The above object is thereby accomplished.

DESCRIPTION OF THE PREFERRED EMBODIMENTS

Figure 1:
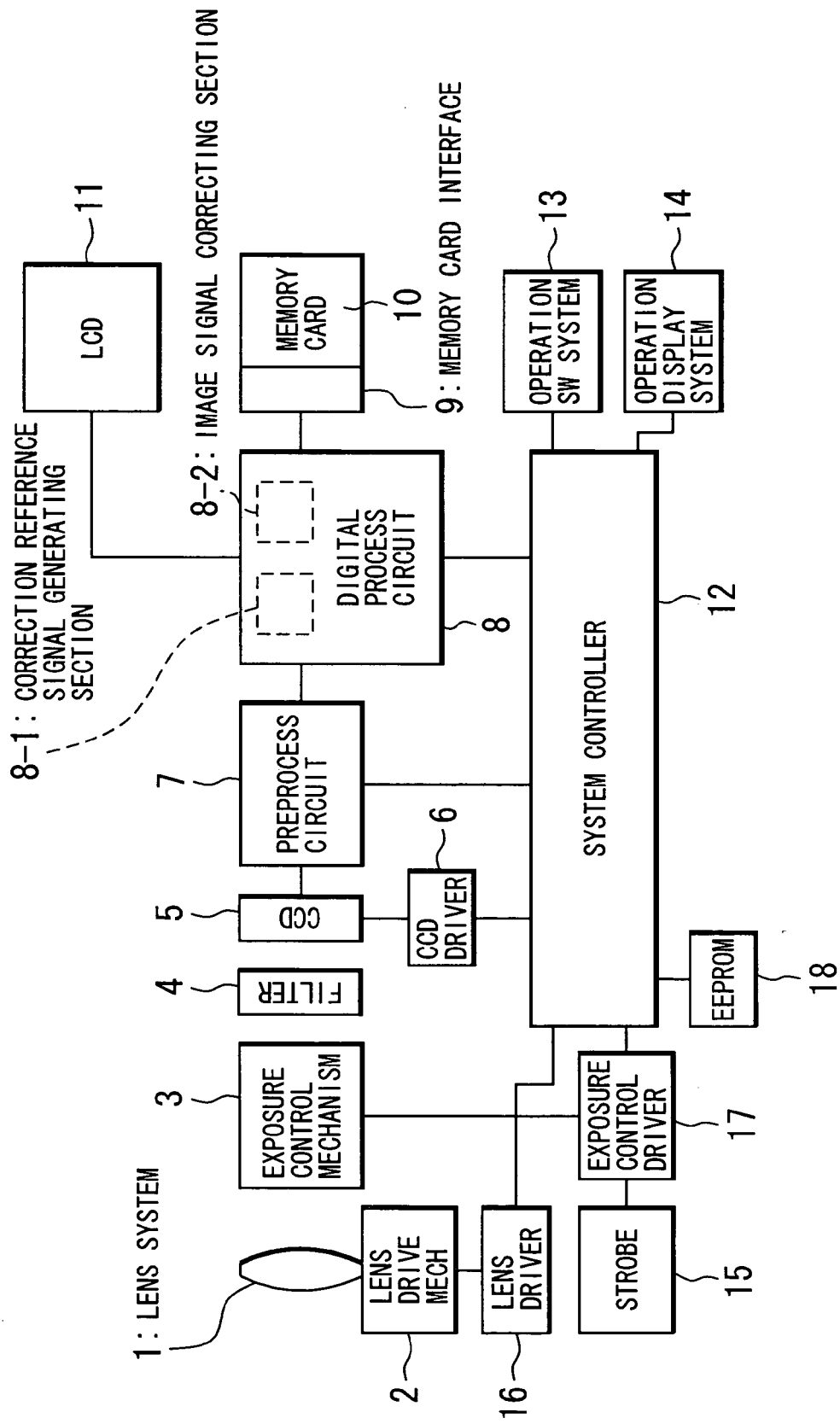
FIG. 1 is a schematic block diagram showing the construction of digital camera as a whole of a first embodiment of the image pickup apparatus according to the invention.

An embodiments of the present invention will now be described. FIG. 1 is a block diagram showing a digital camera as a first embodiment of the image pickup apparatus according to the invention. Included are: 1, lens system; 2, lens drive mechanism; 3, exposure control mechanism; 4, filter system; 5, CCD image pickup device; 6, CCD driver; 7, preprocess circuit including an analog-to-digital converter; 8, digital process circuit including a memory as hardware, for performing all the digital processing. Also shown are: 9, memory card interface; 10, memory card; 11, LCD image display system; 12, system controller including a microcomputer as its main component; 13, operation switch system; 14, operation display system including an indicating LCD; 15 strobe; 16, lens driver; 17, exposure control driver; 18, EEPROM.

In thus constructed digital camera, all the control is generally performed by the system controller 12 which, in particular, controls a shutter device in the exposure control mechanism 3 and drive of the CCD image pickup device 5 by the CCD driver 6 to perform exposure (charge accumulation) and readout of signals. These are stored to the digital process circuit 8 through the preprocess circuit 7 including an analog-to-digital converter. After subjected to all the necessary types of signal processing therein, these are then displayed on the LCD image display system 11 or recorded on the memory card 10.

The types of signal processing to be performed at the digital process circuit 8 include smear correction processing using output level information of the vertical OB pixels which is a main subject of the invention. In particular, the digital process circuit 8 includes: a correction reference signal generating section 8-1 for generating a smear eliminating reference signal on the basis of the output level of vertical OB pixels; and an image signal correcting section 8-2 for correcting (eliminating smears of) image signals in an effective pixel region by using the smear eliminating reference signal. Further, a normal drive and an optional n-addition drive are performed in readout of image pickup signals by suitably changing the pattern of drive clock of the CCD driver 6 as required.

Figure 2:
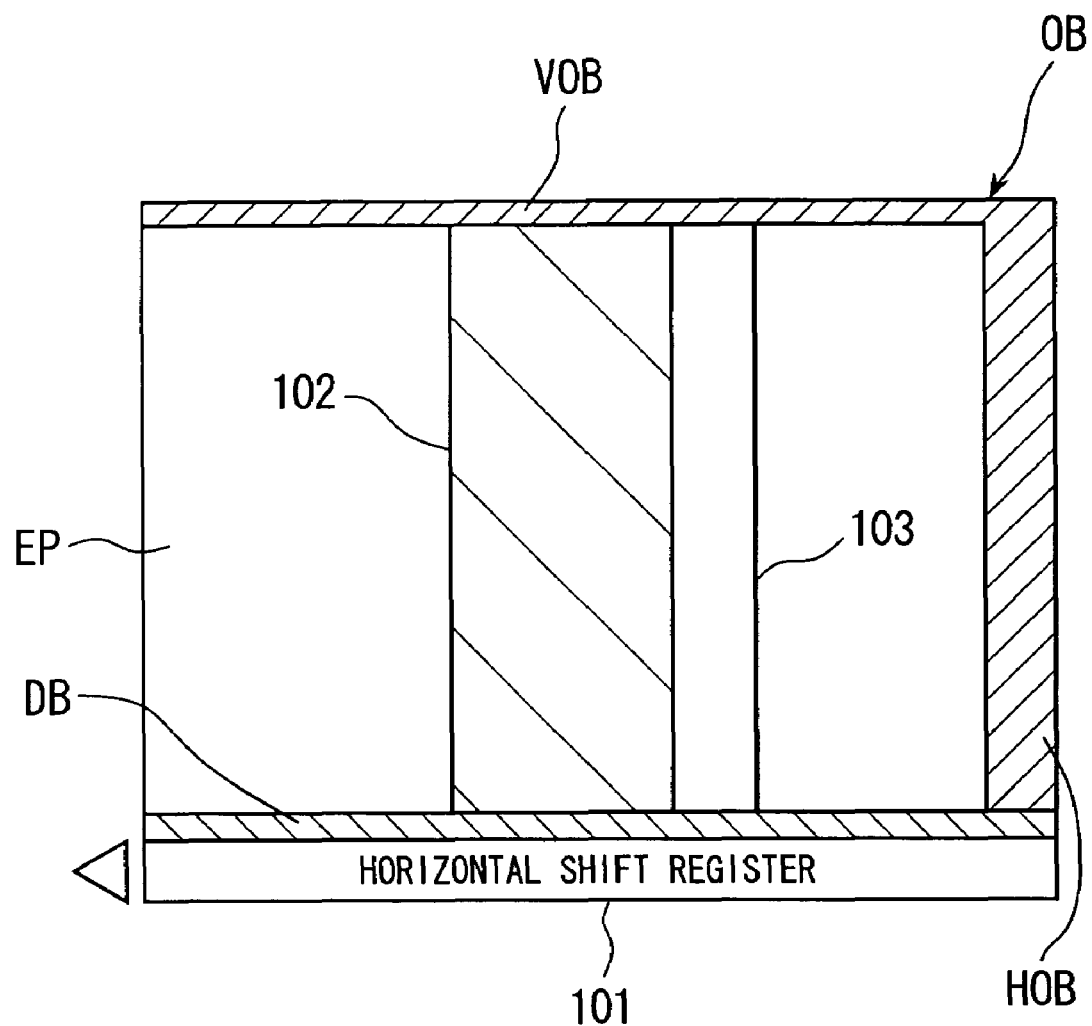
FIG. 2 schematically shows a sensor region of CCD image pickup device in the embodiment shown in FIG. 1.
Figure 3:
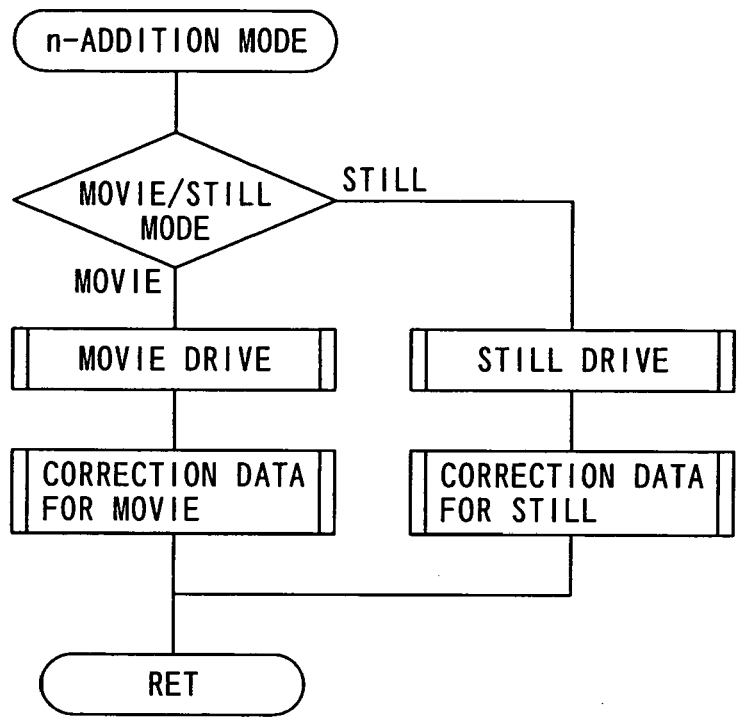
FIG. 3 is a flowchart for schematically showing the processing at the time of movie operation and still operation in the case of n-addition drive.
Figure 4:
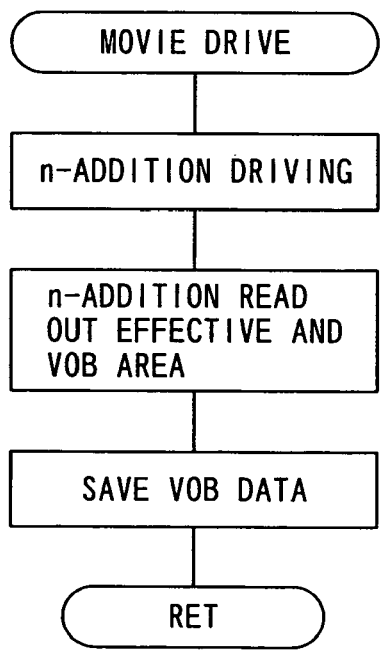
FIG. 4 is a flowchart showing the processing operation in movie operation.
Figure 5:
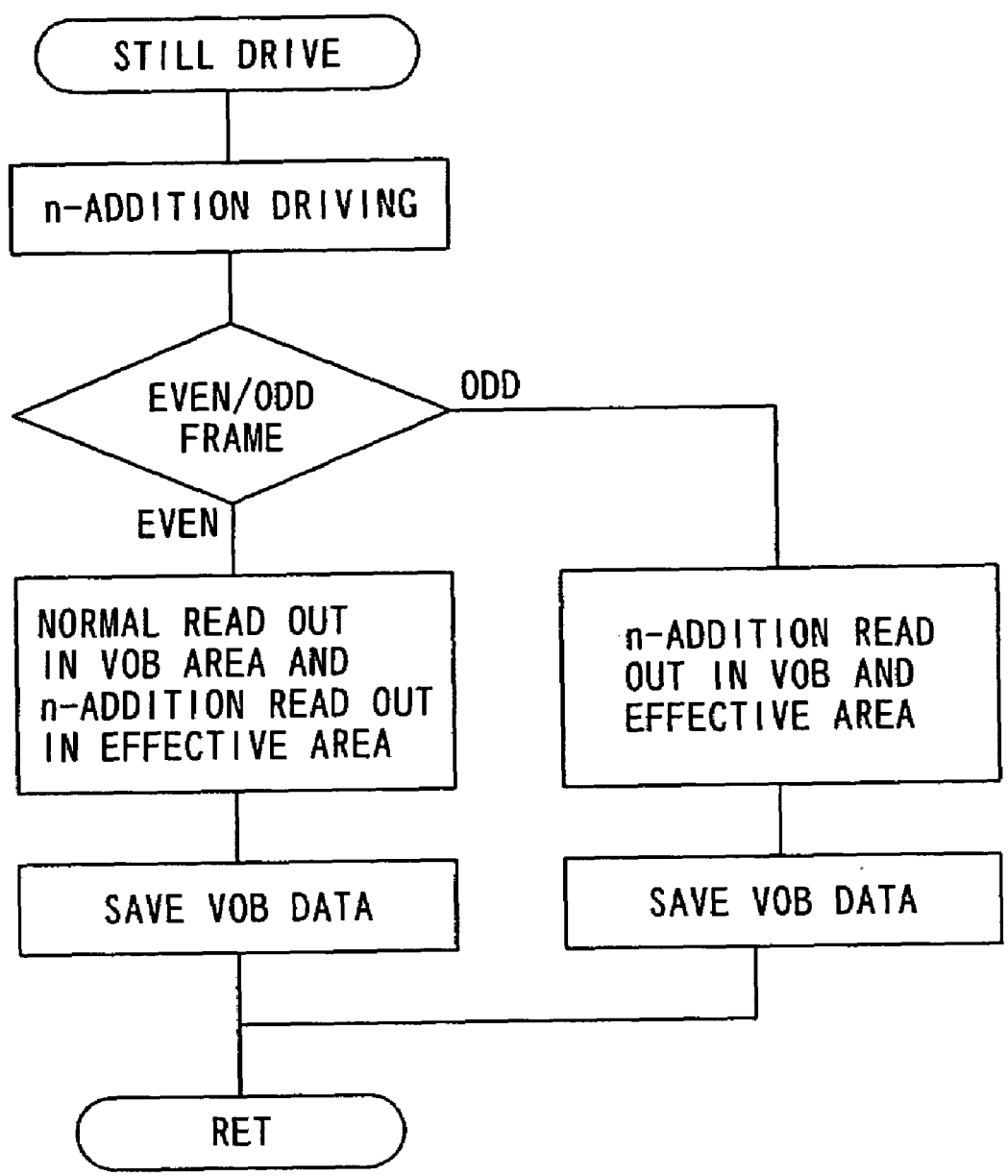
FIG. 5 is a flowchart showing the processing operation in still operation.
Figure 6:
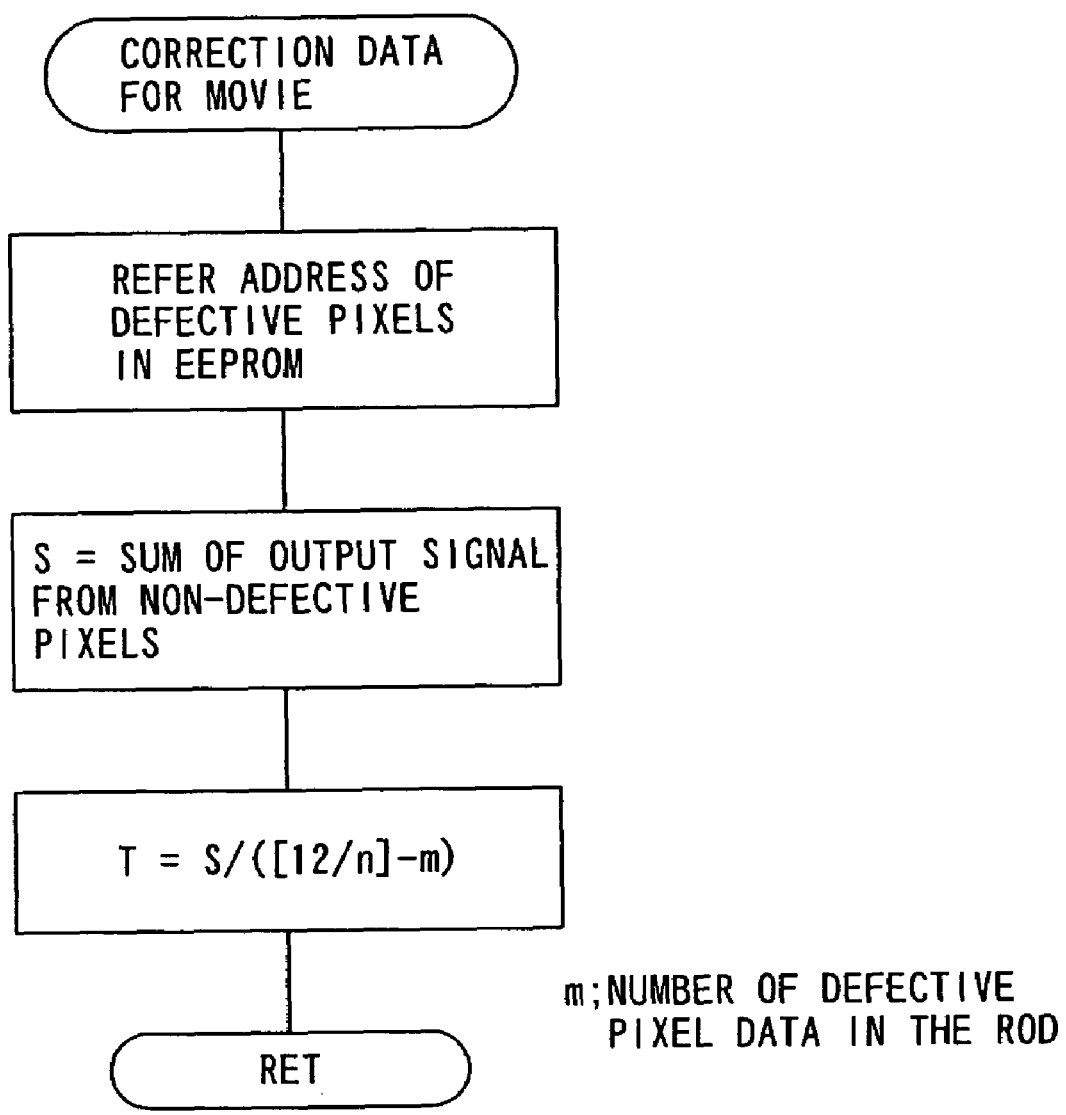
FIG. 6 is a flowchart showing the computation process of the correction reference signal in movie operation.
Figure 7:
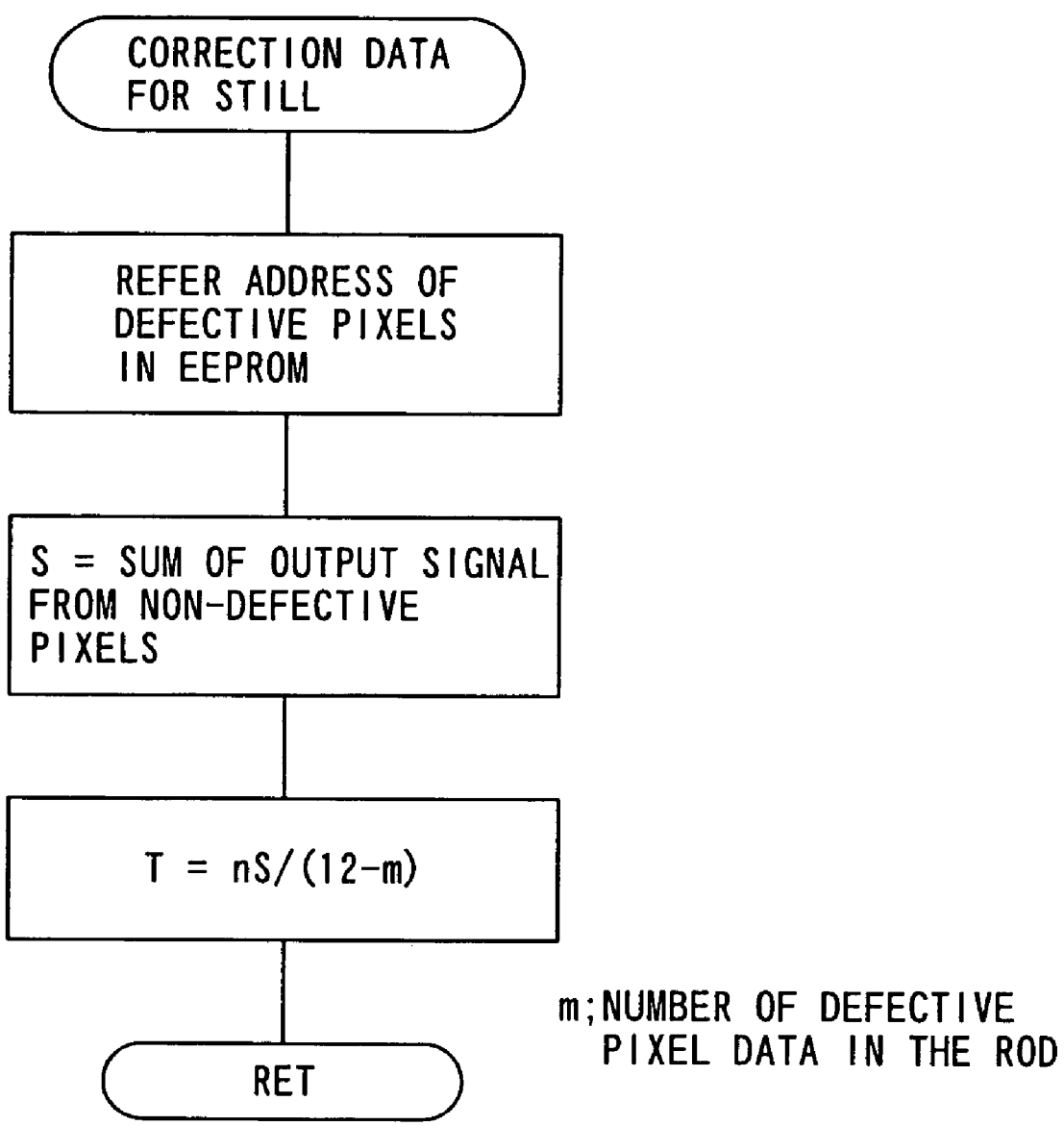
FIG. 7 is a flowchart showing the computation process of the correction reference signal in still operation.

FIG. 2 schematically shows a sensor region of the CCD image pickup device 5. The sensor region is consisting of an effective pixel portion EP forming an imaging area consisting of a pixel array disposed substantially at the center, and VOB and HOB which are OB (optical black pixel portion) for determining black reference respectively in the vertical and horizontal directions. In the present embodiment, such optical black pixel portion "OB" is consisting of VOB, i.e., a vertical OB forming a pixel array of 12 lines in the vertical direction above the effective pixel portion EP and HOB, i.e., a horizontal OB of 40 pixels horizontally on the right side of the effective pixel portion EP. These OB regions are constructed by covering a light-shielding film onto the sensor. Smears do exist also in such VOB as in the effective pixel portion EP. Usually, the imaging output signal obtained from VOB contains a smear signal at the same level as in the imaging output signal obtained from the effective pixel portion EP.

Further, dummy bits DB, i.e., additionally provided vertical transfer lines corresponding to 12 lines, are provided at a lower end portion of the vertical transfer lines of the CCD image pickup device 5 directly before a horizontal transfer line (horizontal shift register) 101. This portion is optically shielded in a similar manner as the horizontal transfer line 101 and OB region. Accordingly, smears do not occur at the time of DB transfer. Referring to FIG. 2, numerals 102, 103 each represent an example of smear that occurs when correction processing is not performed.

It should be noted that the digital camera according to the present embodiment performs a movie (consecutive imaging) operation corresponding to a composition defining electronic finder and a still (static image taking) operation which is the main image taking. In the case of movie, the exposure time is controlled only by a so-called device shutter which is based on control of charge accumulation at the image pickup image pickup device. In the case of still, too, an exposure time control solely depending on the device shutter is used if it is difficult to also use a mechanical shutter for example at the time of sequential photographing. At least in these cases, therefore, smears do occur as described in the above described prior art example if correction is not performed. For this reason, the smear correction processing is to be applied at least to such cases.

For ease and simplicity of explanation, the digital camera according to the present embodiment as will be described in the following does not have a mechanical shutter. All exposure time control is performed only by the device shutter including the case of taking a static image consisting of only one frame. In the case of movie operation of the digital camera according to the present embodiment, all the images respectively outputted at each of the consecutive frames (or field in an interlaced scanning, hereinafter) are used for display. In the case of still operation, however, the image of only one frame or, for example in sequential photographing, of one frame per two frames at most is subject to recording (and display). When n-addition drive is used, image pickup device drive and operation processing for the correction of smears are performed differently between at the time of movie operation and at the time of still operation.

A description will now be given with respect to camera control by the system controller 12 with focusing on the processing directly related to smear correction in the digital camera according to the present embodiment. Address of fault pixels of the image pickup device 5 as previously determined by an inspection in its manufacturing process including that of those in OB region is stored in the EEPROM 18. The criterion of defect in the inspection, however, is different between that for the effective area and that for OB area. A stricter level condition is applied to that for OB area. Address information of fault pixels in the effective area is used in a known pixel defect compensation processing and description thereof will be omitted.

After storing the imaging output signals corresponding to one frame obtained as sequentially reading signal charges produced by an exposure in the above described respective operation to a predetermined memory region of the digital processing circuit 8, a smear eliminating reference signal is computed at the correction reference signal generating section 8-1 by using output of V0B, i.e., the vertical 0B. Here, if without a pixel defect and in normal drive, the sum is calculated, as in the prior-art technique disclosed in the above cited laid-open application, of every 12 pixels having the same horizontal address (hereinafter: a pixel group consisting of such 12 pixels being referred to as "rod") of the data of 0B pixels which constitute 12 lines. It is divided by the number of pixels, 12, to obtain a mean value. In other words, image signal of one line where each one pixel corresponds to the mean value of each rod is defined as the smear eliminating reference signal.

The smear correction processing by the image signal correcting section 8-2 in the present embodiment is characterized in that drive mode and pixel defect are also considered in such processing. The method of drive for this is also contrived to perform different processing between movie operation and still operation. The case of n-addition drive will now be described with respect to processing at the time of movie operation and that at the time of still operation.

[1] Processing at the Time of Movie Operation:

The above described known n-addition drive is used as the drive method of the image pickup device uniformly for all the scan region including the OB region. Accordingly, both the pixels in OB region and the pixels in the effective region are respectively added for n, and the output pixel number (number of data units) at the time of readout of each rod is reduced to "12/n" (the quotient, a whole number, of 12 divided by n). At this time, depending on the value of n, etc., those outputted include a signal data where charges are added of pixels of V0B, i.e., vertical 0B region and pixels of the effective region EP and a signal data where n pixel signals are not contained as it is positioned at an end. Those data as they are can be used neither as 0B nor as effective output signal and become discard data which are not used as data.

Before obtaining the sum of each rod for correction of smears, then, the address of the fault pixels stored in the EEPROM 18 is looked up. If there is a fault pixel in the pertinent rod, it is determined whether or not there is an output signal data obtained as addition of n units only of faultless pixels without including fault pixels. If there is, the sum (or the value as it is if there is only one) of data consisting only of such faultless pixels is obtained. It is then divided by "what is obtained by subtracting the number of data including fault pixels from [12/n] (the number of data in rod), i.e., the number of data consisting only of faultless pixels in the pertinent rod" to obtain a mean value corresponding to n pixels only of the faultless pixels of the pertinent rod. In other words, the smear eliminating reference signal is formed as image signals at the time of n-addition drive corresponding to one line of the values obtained as mean values of readout data without containing fault pixels in each rod. Accordingly, in correcting smears at this time: (1) correction is performed of accurate level corresponding to drive mode; and (2) the fault pixels in OB region have no effect thereupon.

On the other hand, if there are too many defects or if the value of n is large, it is possible that an n-added output signal data only of faultless pixels without including a fault pixel does not exist in respect of the pertinent rod. For example, since the number of output data of a rod becomes 1 in the case where n≧7>"pixel number in rod"/2, the sate as described above occurs if at least one is defective out of n pixels corresponding to the data.

In such a case, it is unavoidable, even if defect is contained, to obtain the sum of the data (or the value as it is if there is only one) by ignoring the defect. In this case, too, the effect of defect is relatively diluted in the process of n addition and data summation operation, though the effect of the fault pixels cannot be totally eliminated.

In other words, although the case of imperfect processing occurs depending on the presence of pixel defects as the condition may be, it is also possible unlike the prior-art technique to correspond to n-addition drive and to correct smears with an improved performance. Even this is sufficiently advantageous, since the movie operation in a still camera is mainly used in a composition defining display, i.e., the so-called electronic view finder, etc.

[2] Processing at the Time of Still Operation:

In this case, for the effective region EP, the above described known n-addition drive is used as the drive method of the image pickup device. For V0B, i.e., the vertical 0B region, then, it is switched between normal drive and the n-addition drive for every other frame. A complete elimination is thereby achieved of the information of defect pixel which in some cases cannot be removed by the processing at the time of the above described movie drive.

In this case, a frame that is subject to recording, etc., is the frame of which the effective pixel-region EP is read out directly after the performance of n-addition drive with respect to V0B. Hereinafter this will be referred to as a first frame. In particular, suppose V transfer line as in its state directly before the readout onto the V transfer line by shift pulse of charges to be read out in such first frame. It is in an equivalent state as in the case of movie drive of the above described [1], since a certain type of n-addition drive has been performed for the duration of the drive of previous one frame. It is also similar when charges are shifted to read pixel charges corresponding to the effective region EP of the first frame so that data added by n-addition drive are outputted in a similar manner as in the movie drive. After the completion of such readout of the effective region EP, from the point in time at which pixel charge of V0B region is first transferred onto the horizontal transfer line, pixel signals are read out with switching to a normal drive where the transfer pixel number (vertical transfer clock number) in a H blanking period is "1". After the completion of such V0B readout, the processing is returned to the original n-addition drive again. Thereafter, in the case where consecutive images are additionally required, V0B of the next frame is read out with keeping the n-addition drive, V0B of the frame directly after the next with changed again to the normal drive, and so on.

At this time, in the state switched to the normal drive, since all the pixel charges of V0B region have already been transferred down to the dummy bits DB which is an optically shielded portion, smears do not occur after this point in time. Here, when the pixel charges of such V0B region are being transferred through the effective pixel region EP, exactly the same n-addition drive is used as at the time of transfer of charges of the effective pixel region EP which have been previously read out in the first frame. Hence the smear component occurring in the V0B output signal is exactly the same as that in the effective pixel region EP. Accordingly, in generation of the smear eliminating reference signal, it suffices to consider only that the data has not been subjected to n-addition. Specifically, it is achieved in the manner as follows.

First, before obtaining the sum of each rod, address data of fault pixels stored in the EEPROM 18 is looked up. If there is a fault pixel in the pertinent rod, such pixels are excluded and the sum is obtained only of the remaining faultless pixels. After multiplied by "n", it is then divided by "what (the number of faultless pixels in the pertinent rod) is obtained by subtracting the number of fault pixels from 12 (the total number of pixels in the rod)". A mean value is thereby obtained as that corresponding to addition of n pixels only of the faultless pixels of the pertinent rod. In other words, the obtained smear eliminating signal is an image signal corresponding to one line, each pixel signal thereof having a value which is "n times the mean value only of faultless pixels in each rod". Accordingly, in correcting smears at this time: (1) correction is performed of suitable level corresponding to drive mode; and (2) the fault pixels in 0B region have no effect thereupon.

In this case, unlike the correction at the time of movie drive of [1], since data of V0B is read out separately for each pixel, an elimination of one pixel defect does not sacrifice other faultless pixels. It is thus significantly characterized in that it is, in actuality, always possible to generate the smear eliminating reference signal only from data of faultless pixels even when the defect of pixels is relatively greater in quantity or when the number of addition "n" is large. Further, since the divisor is adjusted after removing data of fault pixels so as to correspond thereto, an equal ratio is kept for the weight of faultless pixels in respect of the pertinent rod of each 0B line contained in the smear eliminating reference signal. Hence it is superior also in that the advantage of reducing the effect of randomized noise is not adversely affected. In this manner, it is possible to keep a highly favorable quality of the image to be recorded at the time of still operation.

It should be noted that, when driven correspondingly to the still operation, normal drive (non-addition) readout of V0B is performed for one out of every two frames. Concerning the frame (hereinafter referred to as a second frame) of which the effective pixel region EP is read out directly after such normal drive readout of V0B, the image signal of the second frame during such V0B normal drive period is being transferred through the vertical transfer line within the effective pixel region EP. For and only for this period, it is transferred slower than it is in other periods with taking time that is n times greater. Hence, only those lines being just transferred in the vicinity of a bright object image at that time are to contain a smear component that is higher than, i.e., n times greater that of the other lines. This becomes a new factor in deterioration of image quality. Accordingly, since the image of the second frame is not suitable for recording, only the image of the first frame is selectively used in recording a still photograph.

Thus obtained smear eliminating reference signal is used to correct smears concerning the effective pixel signals. In particular, an output after correction is obtained by subtracting the smear eliminating reference signal from each line data of the pixel signal read out from the effective pixel portion EP. It is obvious that such subtraction is performed of pieces of data having the same horizontal address.

The image signal of the effective pixel region EP after the smear correction processing is furthermore subjected to pixel defect compensation by a known pixel defect compensation means. Such processing is rendered at the digital process circuit 8 on the basis of fault pixel address data stored in the EEPROM 8. There is a significance in performing smear correction first and then defect compensation. If the order is simply reversed, a smear phenomenon itself and/or deterioration of image quality due to smear correction are caused for example when information of a pixel having a horizontal address different from that of the fault pixel is used in interpolation thereof.

The image signal after processed of smear correction and compensation of pixel defect in the above described manner is suitably subjected to various signal processing and then displayed on the LCD image display system 11 or recorded on the memory card 10. The displayed or recorded image becomes a high quality image corrected of smears and hence without an apparent smear.

Various other embodiments are possible in addition to the above described first embodiment. In an example, the present invention is applied to a so-called movie camera (video movie) which is mainly used to take dynamic images. Since the camera shown in the above first embodiment is the so-called digital still camera which is mainly used to take a static image, an attempt for solving the problem without depending on the present invention is also possible by also using an optical shutter such as mechanical shutter, at least if limited to taking of one frame of a static image. By contrast, since taking of dynamic images is the main in the case of a movie camera, there is a general requisite in design not to use an optical shutter including that for static image taking which is an additional function. Hence the advantage of the present invention is more conspicuous therein.

Further, when processing of [1] and processing of [2] in the above first embodiment are compared with each other, the processing of [1] in the case of performing n-addition drive, though can correspond to consecutive image output, has a disadvantage that a problem due to pixel defect remains to some extent. The processing of [2] on the other hand, though superior in image quality, is incapable of corresponding to movie operation, since the most favorable image can be obtained only in the first frame (or one frame out of two frames at most). It should be noted that, for the normal drive corresponding to n=1, both [1] and [2] signify the same processing and do not have such problem as those pointed out above. By noticing this, some modifications are possible as in the following.

In a first modification, smear correction is not performed in the case of movie operation at the time of n-addition drive. In the first place, since V transfer in the case of n-addition drive is performed at a rate n times faster than that in the normal drive, the smear thereof is reduced 1/n as compared to that at the time of normal drive. Accordingly, the first modification is an example of rather selecting one without correction than causing a possibility of new noise occurrence due to the processing of [1] considering the fact that the movie operation at the time of n-addition drive is nothing but to be used for display.

In a second modification, the processing of [2] is used also in the case of movie operation as in that of still. In this case, a smear of level higher than that of other lines as described above occurs at a portion of the image in the second frame. This, however, remains within a level substantially identical to the smear in the case of normal drive (the same before correction and (n−1)/n times after the correction). Also, in respect of regions, it occurs only in 12 lines (before addition or 12/n lines after the added readout) which are equal to the number of lines of V0B containing highly bright spot. Hence such method can be employed if the effect thereof is judged as allowable. A caution is required, however, that a flicker-like noise is caused in the case of movie operation, since the above described high level smear does not occur in the first frame.

In a third modification, while the processing of [2] is being used also in the case of movie operation as in still, the frame rate is compensated for by using a buffer memory. In particular, while a rate "n" times that in the case of normal drive is obtained in the conventional n-addition drive, a rate up to "n/2" times that in the case of normal drive can be obtained by using only the images of the first frames in the correction processing of [2]. By using these as movie mode images, it can be achieved at the same time of securing image quality. For example, if n=12, movie images can be obtained at a rate 6 times greater. It should be noted that an additional component is not required if the digital process circuit 8 itself is caused to serve as the buffer memory.

While, in the above described embodiment and modifications, images after smear correction are to be recorded, or be displayed for use in a monitor function (electronic view finder), they can be applied not only to these but also naturally to any optional purposes. Such applications include as specific examples their application: in automatic control of various signal processing as represented by Automatic Gain Control and Automatic White Balancing; and as information in various automatic control functions such as Automatic Exposure, Automatic Focusing and Automatic Image Stabilizer.

While some embodiments of the present invention and modifications thereof have been specifically described, the present invention is not limited to these and naturally can take any form within the scope as set forth in its claims.

As has been described by way of the above embodiments, it is possible in accordance with the present invention to achieve an image pickup apparatus in which a true smear correction is performed and deterioration of image quality can be prevented even in the case of performing a special drive for example where lines are added in readout of image pickup signals. Particularly, in accordance with its first aspect, since different types of correction reference signal generation processing are performed corresponding to a plurality of drive modes, favorable smear correction can be performed for each drive mode with reducing to a minimum such problems as occurrence of newly added noise due to the correction processing. In accordance with its second aspect, it becomes possible to perform favorable smear correction for the normal mode and for n-addition mode with reducing to a minimum such problems as occurrence of newly added noise due to pixel defect. In accordance with its third aspect, since, even in n-addition mode, readout by normal drive mode is exceptionally performed when reading out the vertical OB pixel signals, newly added noise due to pixel defect does not occur and it becomes possible to perform smear correction of high image quality with adequately suppressing the effect of randomized noise.

What is claimed is:

1. An image pick up apparatus comprising:
   an image pick up device;
   correction reference signal generation means for generating a correction reference signal from output signals of a vertical optical black pixel portion of the image pickup device, for correcting effective image signals outputted as signal of an effective pixel portion of said image pickup device;
   image signal correction means for subtracting said correction reference signal from said effective image signals; and
   image pickup device drive means having a plurality of drive modes for driving said image pickup device to read pixel charge as an output signal;
   wherein said correction reference signal generation means for performing different types of correction reference signal generation processing in generating the reference signal, corresponding to the plurality of drive modes of said image pickup device drive means, and
   wherein said correction reference signal generation means referring to address information relating to defective pixels in the vertical optical black pixel portion of the image pickup device and using only non-defective pixels in the vertical optical black pixel portion for generating said correction reference signal.

2. The image pickup apparatus according to claim 1, wherein one of said plurality of drive modes is a normal drive mode for severally reading out each pixel charge of said image pickup device and another is n-addition drive mode for reading out pixel charges of said image pickup device as vertically added for a predetermined number n (n being a whole number greater than 1).

3. The image pickup apparatus according to claim 2, wherein even in said n-addition drive mode, readout is exceptionally performed by the normal drive mode for severally reading out each pixel charge when reading out said vertical optical black pixel portion.

4. An image pick up apparatus comprising:

an image pick up device having an effective pixel region formed of a pixel array disposed substantially at the center of a light receiving portion and an optically shielded pixel region formed of a pixel array disposed adjacent to the effective pixel region and covered by a light-shielding member;

drive means for supplying to said image pickup device a plurality of drive clock pattern as drive signals corresponding to a plurality of readout modes and for respectively reading out signals of the effective pixel region and signals of the optically shielded pixel region of said image pickup device corresponding to said plurality of readout modes; and correction means for subtracting a readout signal of said optically shielded pixel region from a readout signal of said effective pixel region of said image pick up device, wherein said correction means referring to address information relating to defective pixels in the optically shielded pixel region of the image pickup device and using only non-defective pixels in the optically shielded pixel region.

5. The image pickup apparatus according to claim 4, wherein said plurality of readout modes of said drive means comprise a first readout mode for severally reading all the pixels in the effective pixel region and a second readout mode for reading by adding vertically a string of pixels of a predetermined number greater than two in said effective pixel region.

6. The image pickup apparatus according to claim 4, wherein said plurality of readout modes of said drive means comprises a dynamic image taking mode and a still image taking mode.

7. The image pickup apparatus according to claim 4, wherein said optically shielded pixel region comprises a predetermined number of horizontal pixel rows.

8. An image pickup apparatus having a plurality of operation modes, comprising:

an image pickup device having a two-dimensional substantial imaging area and at an least optical black area arranged in a row direction, the optical black area being covered with a surface metal layer for blocking incident light;

a driver section for driving the image pickup device in the plurality of operation modes;

a reference signal generating section for generating a reference signal corresponding to the plurality of operation modes, the reference signal generating section referring to an address of a defective pixel in the optical black area of the image pickup device and using only non-defective pixels in the optical black area for generating said reference signal; and a signal correcting section for subtracting the reference signal from the substantial imaging signal of the image pickup device.

9. The image apparatus according to claim 8, wherein the address of a defective pixel in the optical black area of the image pickup device being stored in a nonvolatile memory.

* * * * *